(12) United States Patent
Zaborszki

(10) Patent No.: US 11,598,470 B2
(45) Date of Patent: Mar. 7, 2023

(54) DUAL LAYER HOSE WITH VENTING PORT

(71) Applicant: Swagelok Company, Solon, OH (US)

(72) Inventor: Stephen J. Zaborszki, Northfield Center, OH (US)

(73) Assignee: SWAGELOK COMPANY, Solon, OH (US)

(*) Notice: Subject to any disclaimer, the term of this patent is extended or adjusted under 35 U.S.C. 154(b) by 107 days.

(21) Appl. No.: 17/315,549

(22) Filed: May 10, 2021

(65) Prior Publication Data
US 2021/0356065 A1    Nov. 18, 2021

Related U.S. Application Data

(60) Provisional application No. 63/024,691, filed on May 14, 2020.

(51) Int. Cl.
*F16L 55/07* (2006.01)
*F16L 11/20* (2006.01)

(52) U.S. Cl.
CPC .............. *F16L 55/07* (2013.01); *F16L 11/20* (2013.01)

(58) Field of Classification Search
CPC .................................. F16L 55/07; F16L 11/20
See application file for complete search history.

(56) References Cited

U.S. PATENT DOCUMENTS

| | | |
|---|---|---|
| 3,934,618 A | 1/1976 | Henderson |
| 4,089,351 A | 5/1978 | Ward et al. |
| 4,150,466 A | 4/1979 | Horvath |
| 4,349,049 A * | 9/1982 | Silvey .................. A01G 23/099 138/104 |
| 5,031,301 A | 7/1991 | Oetiker |
| 5,285,744 A | 2/1994 | Grantham et al. |

(Continued)

FOREIGN PATENT DOCUMENTS

| | | |
|---|---|---|
| CN | 1704638 | 12/2005 |
| CN | 201062697 | 5/2008 |

(Continued)

OTHER PUBLICATIONS

Swagelok Company, Hose and Flexible Tubing, 92 p. brochure, dated at least as early as the filing date of the subject application.

(Continued)

*Primary Examiner* — Craig M Schneider
*Assistant Examiner* — David R Deal
(74) *Attorney, Agent, or Firm* — Calfee, Halter & Griswold LLP

(57) ABSTRACT

A hose assembly includes an inner core tube, a metal outer tube, a first coupling member, and a first collar. The first coupling member has an inboard nose portion extending into a first end of the inner core tube. The metal outer tube surrounds the inner core tube and terminates at a first end axially inward of the first end of the inner core tube, with an outer cavity disposed between the inner core tube and the metal outer tube. The first collar has an outboard clamping portion surrounding the nose portion for clamping retention of the first end of the inner core tube therebetween, and an inboard venting portion welded to the first end of the metal outer tube, with the inboard venting portion including a venting port in fluid communication with the outer cavity.

18 Claims, 3 Drawing Sheets

(56) References Cited

U.S. PATENT DOCUMENTS

| | | | |
|---|---|---|---|
| 5,303,962 A | 4/1994 | Orcutt | |
| 5,613,524 A | 3/1997 | Martucci | |
| 5,782,579 A | 7/1998 | Dupouy | |
| 5,829,483 A | 11/1998 | Tukahara | |
| 6,279,614 B1 | 8/2001 | Riesselmann | |
| 6,494,497 B1 | 12/2002 | Kertesz | |
| 6,502,866 B1 | 1/2003 | Hujisawa et al. | |
| 6,546,951 B1 | 2/2003 | Amenia | |
| 6,848,464 B2 * | 2/2005 | Ransom | F16L 55/07 285/55 |
| 7,178,521 B2 | 2/2007 | Burrow | |
| 7,338,090 B2 | 5/2008 | Baldwin et al. | |
| 7,543,368 B2 | 6/2009 | Ingram | |
| 7,784,837 B2 | 8/2010 | Williams | |
| 8,230,885 B2 | 7/2012 | Krauss et al. | |
| 8,439,405 B2 | 5/2013 | Trujillo et al. | |
| 8,888,139 B2 | 11/2014 | Hunter | |
| 8,997,794 B2 | 4/2015 | Kwon | |
| 9,038,259 B2 | 5/2015 | Wells | |
| 9,273,810 B1 | 3/2016 | Martin | |
| 10,359,387 B2 | 7/2019 | Krutz | |
| 10,591,092 B2 | 3/2020 | Zaborszki | |
| 11,035,515 B2 * | 6/2021 | Di Carlo | F16L 9/18 |
| 11,118,707 B2 * | 9/2021 | Zhang | F16L 11/045 |
| 11,378,207 B2 * | 7/2022 | Dhagat | F16L 13/142 |
| 2002/0017330 A1 | 2/2002 | Armenia | |
| 2005/0229990 A1 | 10/2005 | Hilgert | |
| 2008/0191472 A1 | 8/2008 | Vieregge | |
| 2010/0229992 A1 | 9/2010 | Witz | |
| 2012/0060959 A1 | 3/2012 | Dianetti | |
| 2013/0181445 A1 * | 7/2013 | Glime | F16L 15/04 285/337 |
| 2013/0291988 A1 | 11/2013 | Hegler | |
| 2015/0292661 A1 | 10/2015 | Gilbreath | |
| 2016/0025246 A1 | 1/2016 | Nelson et al. | |
| 2016/0146379 A1 | 5/2016 | LaTulippe et al. | |
| 2018/0231164 A1 | 8/2018 | Nakano | |
| 2019/0078708 A1 | 3/2019 | Hudson | |
| 2019/0226614 A1 | 7/2019 | Carney et al. | |
| 2020/0278055 A1 * | 9/2020 | Zaborszki | F16L 25/0036 |
| 2020/0332926 A1 | 10/2020 | Martucci | |

FOREIGN PATENT DOCUMENTS

| | | |
|---|---|---|
| CN | 104344128 | 2/2015 |
| CN | 105485453 | 4/2016 |
| CN | 205226732 | 5/2016 |
| CN | 205331662 | 6/2016 |
| CN | 205859397 | 1/2017 |
| DE | 4240816 | 6/1994 |
| DE | 102010008733 | 8/2011 |
| EP | 104835 | 4/1984 |
| EP | 629805 | 8/1997 |
| EP | 1650483 | 4/2006 |
| EP | 1368589 | 4/2010 |
| EP | 2327914 | 6/2011 |
| FR | 850967 | 12/1939 |
| FR | 1271016 | 9/1961 |
| FR | 1403408 | 5/1965 |
| GB | 692787 | 6/1953 |
| GB | 746973 | 3/1956 |
| GB | 839262 | 6/1960 |

OTHER PUBLICATIONS

BOA Group, Hose and Bellows Technology for Highest Purity Requirements brochure, 5 pgs., at least as early as the filing date of the subject application.
BOA Group, Hybrid Hose Series, one page brochure, at least as early as the filing date of the subject application.
Swagelok Company, Technical Drawing, Hybrid Hose, one page, Sep. 29, 2015.
Swagelok, BOA Group, Boa NL—Hybrid Hose, dated Oct. 20, 2015, 20 pgs.
International Search Report from PCT/US2021/030778 dated Aug. 12, 2021.

* cited by examiner

DUAL LAYER HOSE WITH VENTING PORT

CROSS-REFERENCE TO RELATED APPLICATION

This application claims priority to and all benefit of U.S. Provisional Patent Application Ser. No. 63/024,691, filed on May 14, 2020, for DUAL LAYER HOSE WITH VENTING PORT, the entire disclosure of which is fully incorporated herein by reference.

TECHNICAL FIELD OF THE INVENTIONS

The present disclosure relates to flexible hose assemblies for fluid containment and transfer under a variety of pressures and temperatures between two points, and to methods of making such hose assemblies. More particularly, the disclosure relates to multi-layer or "hybrid" flexible hose assemblies having a first layer providing a first property (e.g., cleanability) and a second layer providing a second property (e.g., gas impermeability).

SUMMARY OF THE DISCLOSURE

In accordance with an embodiment of one or more of the inventions presented in this disclosure, a hose assembly includes an inner core tube, a metal outer tube, a first coupling member, and a first collar. The first coupling member has an inboard nose portion extending into a first end of the inner core tube. The metal outer tube surrounds the inner core tube and terminates at a first end axially inward of the first end of the inner core tube, with an outer cavity disposed between the inner core tube and the metal outer tube. The first collar has an outboard clamping portion surrounding the nose portion for clamping retention of the first end of the inner core tube therebetween, and an inboard venting portion welded to the first end of the metal outer tube, with the inboard venting portion including a venting port in fluid communication with the outer cavity. In an exemplary arrangement, an outboard end of the outboard clamping portion has a first inner diameter sized to accommodate the flared first end of the inner core tube, an inboard end of the outboard clamping portion includes a radially inward protrusion having a second inner diameter smaller than the first inner diameter and sized to impede withdrawal of the flared first end of the inner core tube from the first collar, and the inboard venting portion has a third inner diameter larger than the second inner diameter and sized to permit fluid flow between the outer cavity and the venting port.

In accordance with another embodiment of one or more of the inventions presented in this disclosure, a method of making a hose assembly is contemplated. In the exemplary method, an inboard portion of a first collar is welded to a first end of a metal outer tube, with the inboard portion of the first collar including a venting port. An inner core tube is installed through the metal outer tube such that a first end of the inner core tube is aligned with an outboard portion of the first collar, with an outer cavity disposed between the inner core tube and the metal outer tube and in fluid communication with the venting port. A nose portion of a first coupling member is inserted into the first end of the inner core tube, such that the first end of the inner core tube is flared into clamping retention between the nose portion and the outboard portion of the first collar.

In accordance with another embodiment of one or more of the inventions presented in this disclosure, a method of using a hose assembly is contemplated. The hose assembly includes an outer metal tube with a first gas permeability and an inner core tube with a second gas permeability greater than the first gas permeability. The inner core tube defines an inner passage and an outer cavity between the inner core tube and the outer metal tube. A first end of the inner core tube is secured in clamping retention between an inner nose portion and an outer collar portion of a coupling connection welded to the outer metal tube. In the exemplary method, a positive pressure gaseous fluid is supplied to the inner passage, such that a portion of the positive pressure gaseous fluid permeates through the inner core tube into the outer cavity. A vacuum is applied to a vent port in the outer collar portion to remove the portion of the positive pressure gaseous fluid from the outer cavity. With positive pressure in the outer cavity eliminated, a remainder of the positive pressure gaseous fluid is evacuated from the inner passage.

DESCRIPTION OF THE EXEMPLARY EMBODIMENTS

Figure 1:
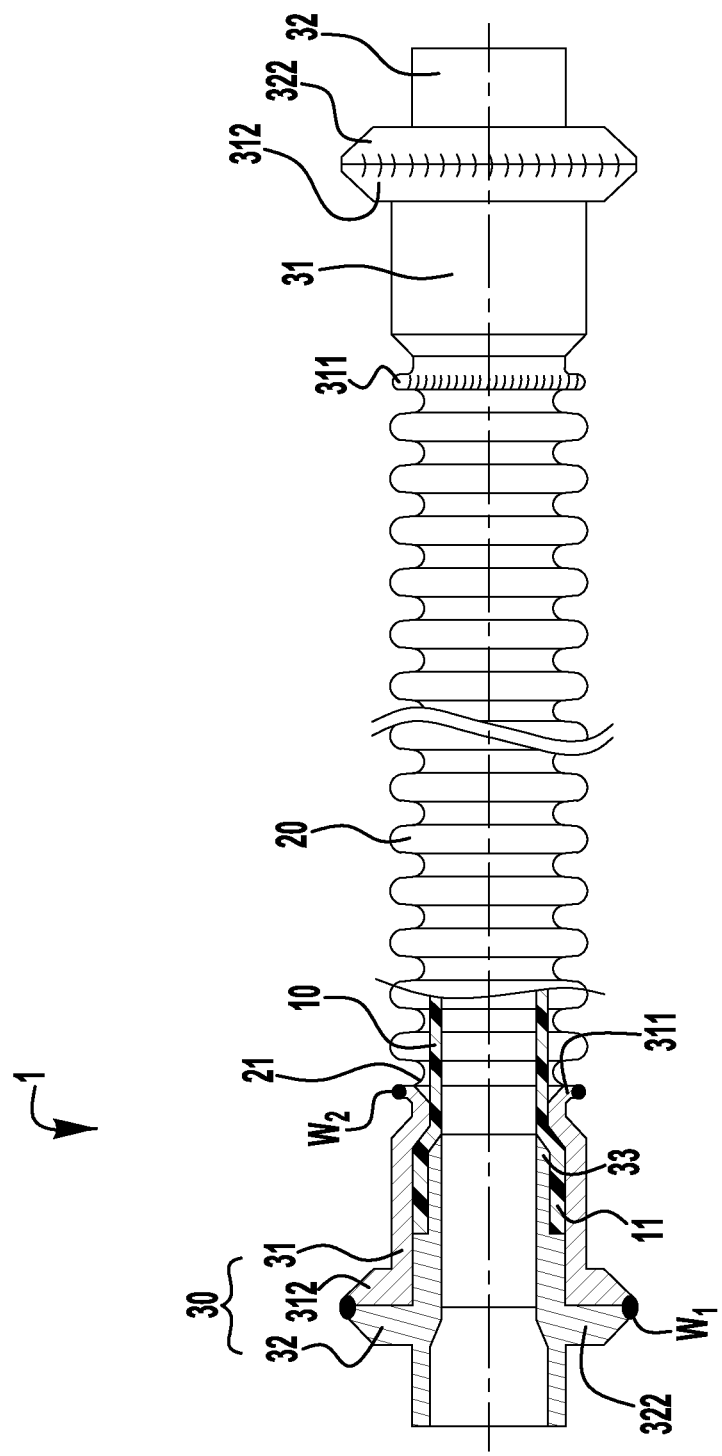
FIG. 1 is a cross-sectional view of an exemplary dual layer hose assembly.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Many applications have requirements for flexible hose to provide a fluid connection between two points in a fluid system, with the flexibility of the hose allowing for various fluid line routing requirements, thermal expansion, misalignment, and intermittent or continuous flexing (e.g., due to system vibrations). In addition to flexibility, different hose properties may be a consideration for use in a particular fluid system, including, for example, system temperature, system pressure, chemical compatibility, resistance to contamination, and gas permeability. In some applications, a multi-layer or "hybrid" flexible hose may be provided with an inner core tube providing a desired first property, and an outer tube providing a desired second property. While the inner and outer tubes may be laminated or otherwise attached to each other, in some embodiments, the inner and outer tubes may be separate from each other, and even radially spaced apart from each other, for example, to facilitate assembly or function of the hose.

FIG. 1 illustrates an exemplary prior art hose assembly 1 including a plastic inner core tube 10 and a corrugated metal outer tube 20, described in greater detail in European Patent Publication No. EP2327914B1 (the "'914 patent"), the entire disclosure of which is incorporated herein by reference. An end portion 11 of the inner core tube 10 is installed over a nose portion 33 of a coupling member 32 and a collar 31 is installed over the inner core tube end portion to radially clamp the core tube end portion 11 between against the coupling member 32 to form a connector 30 secured to the inner core tube end portion. A flange portion 322 of the coupling member is welded (e.g., an orbital weld) at Wi to an outboard flange portion 312 of the collar 31, and an end portion 21 of the metal outer tube 20 is welded (e.g., an orbital weld) at to an inboard flange portion 311 of the collar 31. Another exemplary dual layer hybrid hose arrangement is described in co-owned U.S. Pat. No. 10,591,092 (the "'092 patent"), the entire disclosure of which is incorporated herein by reference.

In a dual layer hybrid hose arrangement (e.g., the hose of the '914 patent), the plastic inner core tube may be selected for superior fluid compatibility, and the corrugated metal outer tube may be selected for gas impermeability (e.g., less than about $1 \times 10^{-5}$ scc/sec or between about $1 \times 10^{-9}$ scc/sec and about $1\lambda 10^{-7}$ scc/sec), to compensate for the relatively higher gas permeability (e.g., greater than about $1\lambda 10^{-4}$ scc/sec, or between about $1 \times 10^{-3}$ scc/sec and about $1\lambda 10^{-2}$ scc/sec) of the inner core tube. For example, the inner core tube may include at least one of polytetrafluoroethylene (PTFE) or perfluoroalkoxy alkane (PFA), and the metal outer tube may include stainless steel (e.g., 316 SS).

In a hybrid hose assembly having a more permeable inner core tube and a less permeable outer tube, certain challenges may result from permeation of system fluid through the wall of the inner core tube into an outer annular cavity between the inner core tube and the outer tube. For example, in applications where pressurized gas has permeated into the outer annular cavity, rapid depressurization of the interior hose passage may result in inward compression or collapse of the inner core tube by the pressurized gas in outer annular cavity. As another example, in applications where the hose is used with a first pressurized gas that has permeated into the outer annular cavity, and is subsequently used with a second fluid, the first pressurized gas may permeate through the wall of the inner core tube into the inner hose passage, contaminating the second fluid.

According to an aspect of the present disclosure, an outer tube of a dual layer hybrid hose may be provided with (e.g., integrally formed with or connected to a component having) one or more vent ports to permit controlled venting or evacuation of any fluid in the radial space or outer annular cavity between the inner core tube and the outer tube of the hose, for example, due to permeation of pressurized gas within the interior hose passage through the gas permeable inner core tube into the outer cavity of the hose. This venting or evacuation of the pressurized gas from the outer cavity may prevent inward compression or collapse of the inner core tube when the interior hose passage is rapidly depressurized, and may prevent contamination of a gas fluid within the interior hose passage by a pressurized second gas fluid remaining in the outer cavity of the hose (e.g., from a prior hose application) and permeating inward through the wall of the inner core tube.

Figure 2:
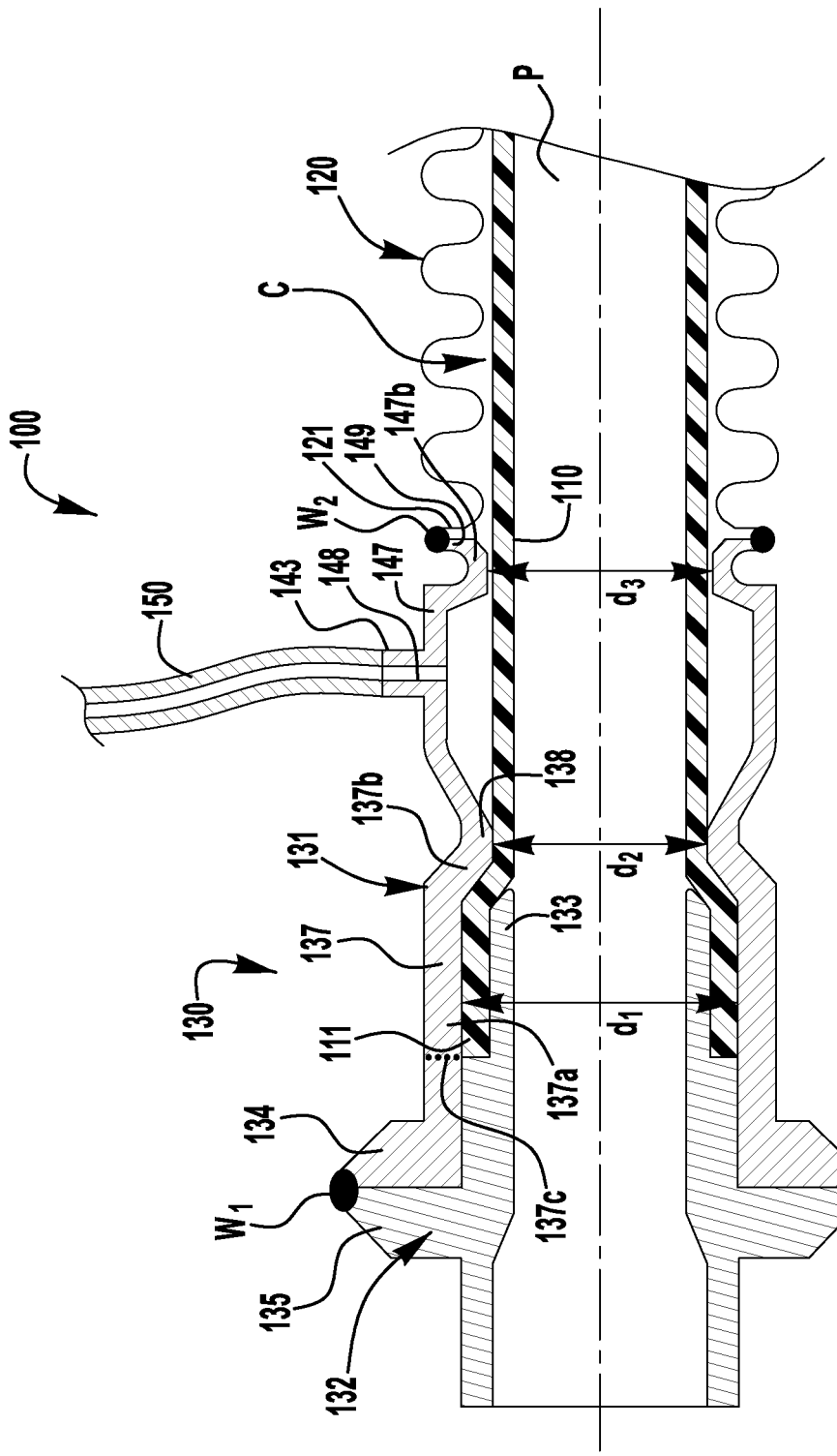
FIG. 2 is a cross-sectional view of a dual layer hose assembly including a vented collar portion, in accordance with an exemplary embodiment of the present disclosure.

In one such arrangement, as shown in FIG. 2, a dual layer hybrid hose 100, having a plastic inner core tube 110 and a corrugated metal outer tube 120, includes a welded coupling connection 130 provided with a venting port 148. Similar to the embodiment shown in FIG. 1 and described above and in the above incorporated '914 patent, the welded coupling connection 130 includes a collar 131 welded to the metal outer tube 120, and a coupling member 132 secured to the collar (e.g., welded) for clamping retention of the first end 111 of the inner core tube 110 between an outboard clamping portion 137 of the collar 131 and a nose portion 133 of the coupling member 132, which is inserted into the inner core tube first end 111. The end of the nose portion 133 may be narrowed or tapered to facilitate insertion and flaring of the core tube end 111. In the illustrated example, a flange portion 135 of the coupling member 132 is secured (e.g., orbital weld at w1) to an outboard flange portion 134 of the collar 131.

In the illustrated embodiment, an outboard end 137a of the outboard clamping portion 137 of the collar 131 has a first inner diameter d1 sized to accommodate the flared first end 111 of the inner core tube 110, and an inboard end 137b of the outboard clamping portion includes a radially inward protrusion 138 having a second inner diameter d2 smaller than the first inner diameter d1 and sized to impede withdrawal of the flared first end of the inner core tube from the collar. The venting port 148 is disposed on an inboard venting portion 147 of the collar that has a third inner diameter d3 larger than the second inner diameter d2 and sized to permit fluid flow between the venting port 148 and an outer annular cavity C between the inner core tube 110 and the metal outer tube 120, for example, by maintaining at least a minimal gap between the collar venting portion 147 and the inner core tube 110. The venting port 148 may include a tube stub 143 or other connector (e.g., integrally formed with or welded to the collar 131) to facilitate connection of the venting port to a purge line 150, for example to apply a vacuum (e.g., any pressure lower than the outer cavity pressure) to the outer cavity C through the venting port 148, or to supply a purge gas to the outer cavity through the venting port. As shown, an inboard end 147b of the venting portion 147 includes a weld end 149 (e.g., flange) sized to facilitate welding (at w2) to the end portion 121 of the metal outer tube 120 (e.g., to an outer corrugation of the corrugated metal tube).

In an exemplary method of producing a vented hybrid hose assembly 100, the weld end 149 of the collar 131 is welded to the end portion 121 of the metal outer tube 120 (e.g., orbital welding). The inner core tube 110 is installed through the metal outer tube 120, such that a first end of the inner core tube is aligned with an outboard portion 137a of the collar 131 (e.g., at a location 137c corresponding to the outboard end of the installed nose portion 133), with an outer cavity C disposed between the inner core tube and the metal outer tube and in fluid communication with the venting port. The nose portion 133 of the coupling member 132 is inserted into the first end 111 of the inner core tube 110, bringing the flange portion 135 of the coupling member 132 into abutment with the outboard flange portion 134 of the collar 131, such that the core tube first end is flared into clamping retention between the nose portion 133 and the outboard clamping portion 137 of the collar 131. The flange portion 135 of the coupling member 132 is then welded to the outboard flange portion 134 of the collar 131.

While the clamping and venting portions 137, 147 of the collar 131 may be integrally formed in a single monolithic collar component, as shown in FIG. 2, in other embodiments, a collar may be formed by a clamping member secured to (e.g., welded to) a venting adapter, for example, to facilitate manufacturing or formation of the clamping and venting portions of the collar.

Figure 3:
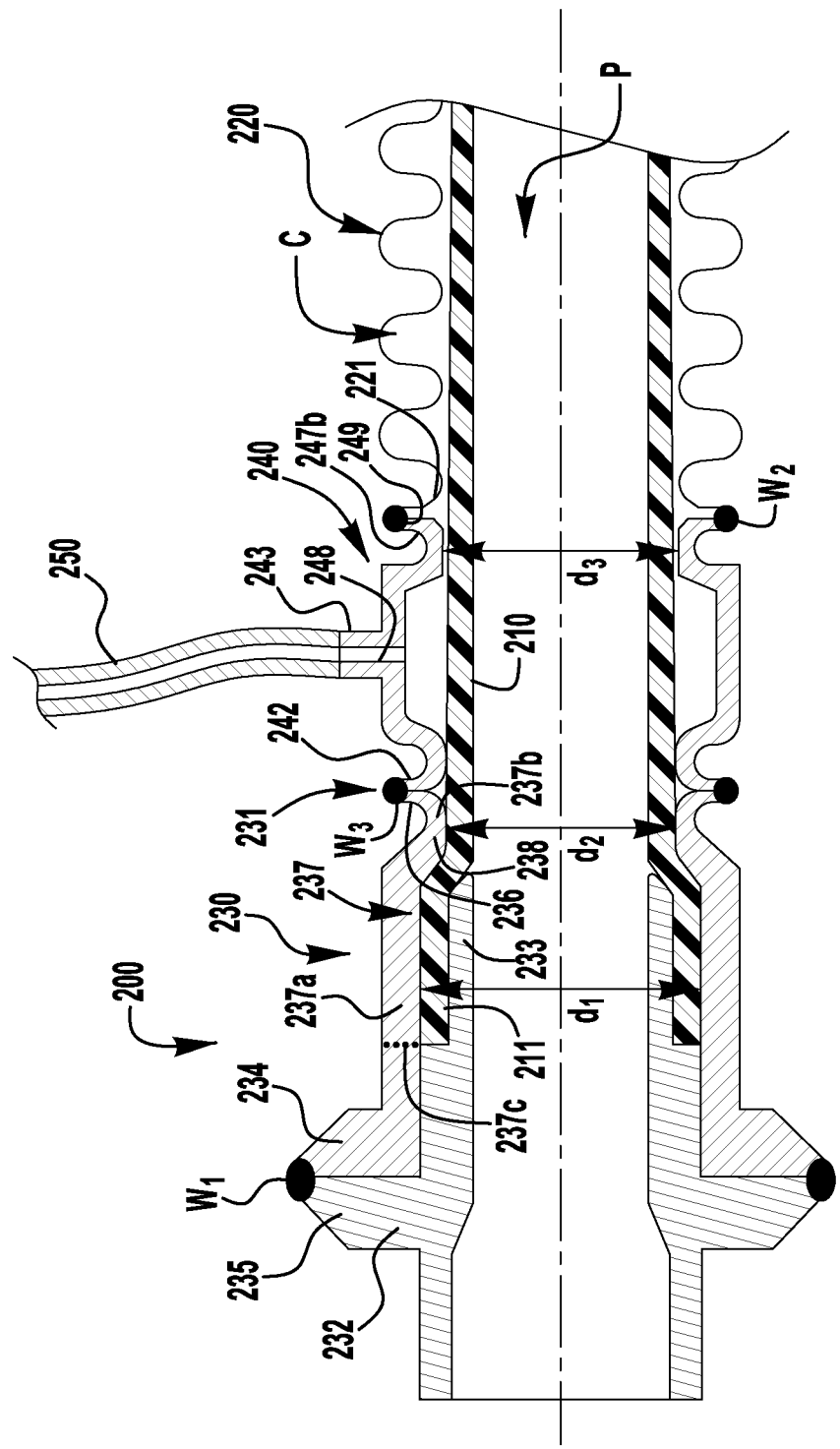
FIG. 3 is a cross-sectional view of a dual layer hose assembly including a collar portion having a welded vent adapter, in accordance with another exemplary embodiment of the present disclosure.

In the illustrated embodiment of FIG. 3, a dual layer hybrid hose 200, having a plastic inner core tube 210 and a corrugated metal outer tube 220, includes a welded coupling connection 230 having a collar 231 formed from a clamping member 239 defining an outboard clamping portion 237, radially inward protrusion 238, and outboard flange portion 234 of the collar 231, and a venting adapter 240 defining an inboard venting portion 247, venting port 248, and weld end flange 249 welded (e.g., an orbital weld at w2) to the end portion 221 of the metal outer tube 220 (e.g., to an outer corrugation of the corrugated metal tube). In the illustrated example, the venting adapter 240 includes an outboard end portion (e.g., flange) 242 welded (e.g., an orbital weld at w3) to an inboard end portion (e.g., flange) 236 of the clamping member 239.

Similar to the embodiments of FIGS. 1 and 2, a coupling member 232 is secured (e.g., welded) to the collar (for clamping retention of the first end 211 of the inner core tube 210 between the outboard clamping portion 237 of the collar 231 and a nose portion 233 of the coupling member 232, which is inserted into the inner core tube first end 211. The end of the nose portion 233 may be narrowed or tapered to facilitate insertion and flaring of the core tube end 211. In the illustrated example, a flange portion 235 of the coupling member 232 is secured (e.g., orbital weld at w1) to the outboard flange portion 234 of the collar 231.

In the illustrated embodiment, an outboard end 237a of the outboard clamping portion 237 of the clamping member 239 has a first inner diameter d1 sized to accommodate the flared first end 211 of the inner core tube 210, and an inboard end 237b of the outboard clamping portion includes a radially inward protrusion 238 having a second inner diameter d2 smaller than the first inner diameter d1 and sized to impede withdrawal of the flared first end of the inner core tube from the collar. The inboard venting portion 247 of the venting adapter 240 has a third inner diameter d3 larger than the second inner diameter d2 and sized to permit fluid flow between the venting port 248 and an outer annular cavity C between the inner core tube 210 and the metal outer tube 220, for example, by maintaining at least a minimal gap between the venting portion 247 and the inner core tube 210. The venting port 248 may include a tube stub 243 (e.g., integrally formed with or welded to the venting adapter 240) or other connector to facilitate connection of the venting port to a purge line 250, for example to apply a vacuum (e.g., any pressure lower than the outer cavity pressure) to the outer cavity C through the venting port 248, or to supply a purge gas to the outer cavity through the venting port.

In an exemplary method of producing a vented hybrid hose assembly 200, the outboard end portion 242 of the venting adapter 240 is welded to the inboard end portion 236 of the clamping member 239 to form the welded collar assembly 231. The weld end 249 of the venting adapter 240 is welded to the end portion 221 of the metal outer tube 220, and the inner core tube 210 is installed through the metal outer tube 220, such that a first end 211 of the inner core tube is aligned with the outboard portion 237a of the clamping member 239 (e.g., at a location 237c corresponding to the outboard end of the installed nose portion 233), with an outer cavity C disposed between the inner core tube and the metal outer tube and in fluid communication with the venting port. The nose portion 233 of the coupling member 232 is inserted into the first end 211 of the inner core tube 210, bringing the flange portion 235 of the coupling member 232 into abutment with the outboard flange portion 234 of the clamping member 239, such that the core tube first end 211 is flared into clamping retention between the nose portion 233 and the outboard clamping portion 237 of the clamping member 239. The flange portion 235 of the coupling member 232 is then welded to the outboard flange portion 234 of the clamping member 239.

In use, to evacuate pressurized gas fluid from the outer cavity C of the hose assembly 100, 200 (e.g., in advance of depressurization of the interior hose passage P, or prior to using the hose with a different gas fluid), the venting port 148, 248 may be connected to a purge line 150, 250 (e.g., hose or tube), for example, to permit release of the pressurized gas (e.g., to atmospheric or vacuum pressure) or to provide continuous evacuation of pressurized gas fluid from the outer cavity C. In another arrangement, a purge gas may be applied to the venting port 148, 248, with the purge gas passing through the length of outer cavity for evacuation the fluid through a venting port at an opposite end of the hose 100, 200 (e.g., through a venting port in a collar portion of a weld connector on the opposite end of the metal outer tube). The venting port 148, 248 may be plugged when not needed (e.g., in low pressure gas service), and may include any suitable end connector, including, for example, a tube butt weld joint (as shown) or a tube fitting connection. While the illustrated embodiment shows a single venting port 148, in other embodiments, more than one venting port may be provided.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

I claim:

1. A hose assembly comprising:
   an inner core tube;
   a first coupling member having an inboard nose portion extending into a flared first end of the inner core tube;
   a metal outer tube surrounding the inner core tube and terminating at a first end axially inward of the first end of the inner core tube, with an outer cavity disposed between the inner core tube and the metal outer tube; and
   a first collar having:
      an outboard clamping portion surrounding the nose portion for clamping retention of the first end of the inner core tube therebetween; and
      an inboard venting portion welded to the first end of the metal outer tube, the inboard venting portion including a venting port in fluid communication with the outer cavity;
   wherein:
      an outboard end of the outboard clamping portion has a first inner diameter sized to accommodate the flared first end of the inner core tube;
      an inboard end of the outboard clamping portion includes a radially inward protrusion having a second inner diameter smaller than the first inner diameter and sized to impede withdrawal of the flared first end of the inner core tube from the first collar; and
      the inboard venting portion has a third inner diameter larger than the second inner diameter and sized to permit fluid flow between the outer cavity and the venting port.

2. The hose assembly of claim 1, wherein the first collar comprises a first clamping member defining the outboard clamping portion and a first venting port adapter defining the inboard venting portion.

3. The hose assembly of claim 2, wherein the first clamping member is welded to the first venting port adapter.

4. The hose assembly of claim 1, wherein the inboard venting portion is integral with the outboard clamping portion.

5. The hose assembly of claim 1, wherein the outboard clamping portion of the first collar is welded to the first coupling member.

6. The hose assembly of claim 1, wherein the outboard clamping portion of the first collar includes an outer radial flange that abuts an outer radial flange of the first coupling member.

7. The hose assembly of claim 6, wherein the outer radial flange of the first collar is welded to the outer radial flange of the first coupling member.

8. The hose assembly of claim 1, wherein the inner core tube comprises plastic.

9. The hose assembly of claim 1, wherein the inner core tube comprises at least one of PTFE and PFA.

10. The hose assembly of claim 1, wherein the inner core tube has a gas permeability greater than about $1 \times 10^{-4}$ scc/sec.

11. The hose assembly of claim 1, wherein the metal outer tube comprises stainless steel.

12. The hose assembly of claim 1, wherein the metal outer tube has a gas permeability less than about $1 \times 10^{-5}$ scc/sec.

13. The hose assembly of claim 1, wherein metal outer tube comprises a corrugated flexible metal tube.

14. The hose assembly of claim 13, wherein an outer portion of an endmost corrugation of the corrugated flexible metal tube is welded to the inboard end of the inboard venting portion of the first collar.

15. The hose assembly of claim 1, further comprising a second coupling member having an inboard nose portion extending into a second end of the inner core tube, and a second collar having an outboard clamping portion surrounding the nose portion of the second coupling member for clamping retention of the second end of the inner core tube therebetween, and an inboard venting portion welded to the second end of the metal outer tube and radially spaced from the inner core tube, the inboard venting portion of the second collar including a venting port in fluid communication with the outer cavity.

16. A method of making a hose assembly, the method comprising:
   welding an inboard portion of a first collar to a first end of a metal outer tube, the inboard portion of the first collar including a venting port;
   installing an inner core tube through the metal outer tube, such that a first end of the inner core tube is aligned with an outboard portion of the first collar, with an outer cavity disposed between the inner core tube and the metal outer tube and in fluid communication with the venting port; and
   inserting a nose portion of a first coupling member into the first end of the inner core tube, such that the first end of the inner core tube is flared into clamping retention between the nose portion and the outboard portion of the first collar.

17. The method of claim 16, further comprising welding the outboard portion of the first collar to the first coupling member.

18. The method of claim 16, wherein inserting the nose portion of the first coupling member into the first end of the inner core tube comprises flaring the first end of the inner core tube into radial engagement with an outboard end of the outboard portion of the first collar, such that a radially inward protrusion at an inboard end of the outboard clamping portion impedes withdrawal of the flared first end of the inner core tube from the first collar.

* * * * *